United States Patent

Postma et al.

[11] Patent Number: 5,180,978
[45] Date of Patent: Jan. 19, 1993

[54] PROXIMITY SENSOR WITH REDUCED TEMPERATURE SENSITIVITY USING A.C. AND D.C. ENERGY

[75] Inventors: Stephen J. Postma, Freeport; Milford M. Gesin, Forreston, both of Ill.; Nick A. Demma, Minneapolis, Minn.; Paul E. Bjork, Forest Lake, Minn.; Thomas J. Wagener, Eden Prairie, Minn.

[73] Assignee: Honeywell Inc., Minneapolis, Minn.

[21] Appl. No.: 801,310

[22] Filed: Dec. 2, 1991

[51] Int. Cl.⁵ .............................................. G01B 7/14
[52] U.S. Cl. ............................ 324/207.16; 324/232; 324/207.26
[58] Field of Search ................... 324/207.16, 207.24, 324/236, 232, 654, 656

[56] References Cited

U.S. PATENT DOCUMENTS

| | | | |
|---|---|---|---|
| 3,956,693 | 5/1976 | Zutrauen et al. | 324/207.16 |
| 4,074,185 | 2/1978 | Dardenne | 324/207.16 |
| 4,509,023 | 4/1985 | Heimlicher | 331/176 |
| 4,591,795 | 5/1986 | McCorkle | 328/5 |
| 4,879,512 | 11/1989 | Leonard et al. | 324/207.16 |
| 4,898,079 | 1/1990 | Kustra et al. | 324/225 |
| 4,942,372 | 7/1990 | Heimlicher | 331/65 |
| 4,954,776 | 9/1990 | Husher | 324/207.16 |
| 5,045,786 | 9/1991 | Fischer | 324/207.16 |

Primary Examiner—Gerard R. Strecker
Assistant Examiner—W. S. Edmonds
Attorney, Agent, or Firm—William D. Lanyi

[57] ABSTRACT

A proximity sensor is provided with a means for directly measuring parameters of a proximity sensor coil which permit the determination of both the AC and DC resistances of the coil. These parameters are then used to determine a discriminator value magnitude according to a mathematical relationship that has been predetermined through previous analysis of empirical data for the particular coil and application intended for the proximity sensor. In one particular application of the present invention, the rear AC resistance is utilized and is added to the DC resistance after the DC resistance has been mathematically altered by a preselected factor. Alternative embodiments of the present invention can also utilize the imaginary AC component of the impedance either by itself or in conjunction with the rear AC component of the impedance. Whether the real or imaginary AC components of the impedance are used individually or together, the DC resistance is used in the determination of the discriminator value magnitude because of its reliable relationship to the temperature of the coil.

24 Claims, 6 Drawing Sheets

PROXIMITY SENSOR WITH REDUCED TEMPERATURE SENSITIVITY USING A.C. AND D.C. ENERGY

BACKGROUND OF THE INVENTION

1. Field of the Invention

The present invention relates generally to proximity sensor and, more particularly, to a proximity sensor that directly measures the AC and DC resistances of the sensor coil and, from these measured parameters, derives a discriminator value which exhibits a significantly reduced temperature sensitivity, is a generally linear function of temperature and indicative of the distance between the proximity sensor and a metallic object.

2. Description of the Prior Art

Proximity sensors have been well known to those skilled in the art for many years. One particularly well known type of proximity sensor is the eddy current killed oscillator, or ECKO, which utilizes an oscillator that generates a radio frequency, or RF field, at the face of the sensor. Together, the oscillator and the sensor form a tuned circuit which oscillates at a predetermined frequency. When a metallic object, or target, is moved toward the face of the sensor, eddy currents are established in the target as a result of the oscillating magnetic field. The development of these eddy currents cause the oscillations to diminish in amplitude, or be killed. Typically, an integrator converts the sine wave signal, which is generated by the oscillator, into a DC signal. The DC signal, which varies in amplitude with the amplitude of the oscillator, is sensed by a device, such as a Schmitt trigger, and converted into a digital signal. The digital signal represents the presence or absence of a metallic target in the region of the sensor face.

Sensors of the type described above utilize a threshold detector which can be used to convert the analog DC signal into a digital output which indicates the presence of a metal target. The magnitude of the DC signal varies as a representative function of the distance between the face of the sensor and the target. However, sensors of this type are not commonly utilized to determine the actual distance between the target and the sensor face over a wide range of target distances because of the severe effect that temperature changes have on the accuracy of the sensor output. Because of this deleterious affect of temperature on the DC signal of a proximity sensor, the inability of a proximity sensor to provide a signal that is reliable and repeatable for a wide range of target distances at all temperatures inhibits the use of this type of sensor in a distance measuring application. The severe affect of temperature change of the magnitude of the DC signal therefore prevents proximity sensors of this type from being reliably used to measure the distance between the target and the face of the sensor.

U.S. Pat. No. 4,074,185, which issued to Dardenne on Feb. 14, 1978 describes a method and apparatus for measuring the position of a magnetic rod. An induction coil is fed by means of constant AC current supply and the resulting voltage which appears across the terminals of the coil is measured. The reactive component value of the voltage is determined and used as a representative signal of the position occupied by the magnetic rod in the coil. This apparatus measures the reactive component of the voltage and not the AC or DC resistances.

U.S. Pat. No. 4,509,023, which issued to Heimlicher on Apr. 2, 1985, describes an oscillator with a temperature compensated oscillating coil. It describes a method by which the temperature coefficient of the copper resistance in an oscillating coil is used to compensate for the temperature coefficient of the quality factor of the same coil. An AC voltage that is proportional to the copper resistance of the oscillating coil is generated in the oscillating circuit. The oscillator comprises an oscillating coil which, in turn, comprises a high frequency litz wire. To access the copper resistance of the coil, one of the litz wires is separated from the other wire at a first terminal of the coil and separately connected to a second terminal of the coil. From the second terminal, the coil is seen as a bifilar coil. A constant alternating current source is connected to the second terminal in order to generate an AC voltage across the oscillating circuit that is proportional to the copper resistance of the coil. The oscillator is intended for use in proximity switches which have relatively large switching distances. This device is primarily intended to compensate for the quality factor of an oscillating coil. In addition, the device described in this patent injects a voltage into the separated litz wire which is opposite to that of the oscillator voltage. Furthermore, this patent does not describe a method which measures impedance values.

U.S. Pat. No. 4,591,795, which issued to McCorkle on May 27, 1986, describes a signal conditioning circuit for a linear/rotary variable differential transformer (L/R VDT). The circuit described in this patent can be utilized for ratiometric comparison of L/R VDT primary coil peak excitation and L/R VDT secondary coil peak response. Unique peak detectors are used for detecting both primary and secondary peak values. The circuit may include an oscillator having resistive and capacitive elements in a tank circuit which also includes the L/R VDT primary coil. Offset errors may be determined externally by providing for a momentary shutdown of the oscillator to permit the measurement of DC components to the signal conditioner and excitation DC output. The device described in the McCorkle patent requires that the oscillator be shut down for the period of time required to measure the DC characteristics of the coil. By the nature of this device, it appears to require at least two or three coils and, in the preferred embodiment, utilizes peak detectors.

U.S. Pat. No. 4,893,079, which issued to Kustra et al on Jan. 9, 1990, describes a method and apparatus for correcting an eddy current signal voltage for temperature affects. This device measures physical characteristics of an electrically conductive material by the use of eddy current techniques and compensates measurement errors which are caused by changes in temperature. It includes a switching arrangement connected between primary and reference coils of an eddy current probe which allows the probe to be selectively connected between an eddy current output oscilloscope and a digital ohmmeter for measuring the resistances of the primary and reference coils substantially at the time of eddy current By using this technique, changes in resistance due to temperature affects can be compensated for in determining the true error in the eddy current measurement. The true error can therefore be converted into an equivalent eddy current measurement correction. This device uses a reference and a primary sense coil and the detection method utilizes a balanced bridge scheme.

U.S. Pat. No. 4,942,372, which issued to Heimlicher on Jul. 17, 1990, describes a method and a circuit for reduction of temperature dependance in an oscillator. This circuit, which is generally similar to the other Heimlicher patent described above, reduces the temperature dependance of an oscillator by a circuit that uses two positive feedback paths to provide the positive feedback necessary for maintaining the oscillation of an LC-oscillating circuit. On of the two feedback paths compensates the temperature dependant influences while the other compensates temperature independent influences.

It would be beneficial if a proximity sensor could utilize its single coil in cooperation with a circuit which provides means to directly read the AC and DC resistances of the coil to permit the derivation of a temperature independent discriminator value that can be used to determine the distance between a target and the face of the sensor with sufficient accuracy to confidently and reliably determine the distance between the sensor and the target.

SUMMARY OF THE INVENTION

The present invention provides a sensor circuit which permits the direct measurement of the AC and DC currents flowing through the sensor coil. In a preferred embodiment of the present invention, the AC resistance and the DC resistance are measured and a discriminator value magnitude is derived as a function of these two parameters. In determining the magnitude of the discriminator value, the AC resistance is added to the DC resistance after the DC resistance is multiplied by a predetermined factor which has been empirically derived for the particular sensor operating in a particular manner. In other words, if the sensor is intended to measure the distance between its face and an aluminum target, the magnitude of the factor, which is referred to below as $K_{RE}$, is specifically determined for those circumstances. In addition, magnitudes of the discriminator value d are empirically determined for a plurality of exemplary distances between the target and the sensor face. When the magnitude of the discriminator is determined during actual operation of the sensor, that magnitude can be compared to a plurality of threshold levels to determine the actual distance between the face of the sensor and the target.

In ideal circumstances, the magnitude of the discriminator value is determined as a linear or pseudolinear function of the target distance from the sensor face which is independent from temperature. The precise determination of the relationship between the discriminator magnitude and the AC and DC resistances would normally require complex mathematical and statistical determinations, with third order relationships, if a perfectly linear and temperature independent discriminator value is to be achieved. However, a significant improvement in measurement accuracy is achieved by the present invention even with a relatively simple first order relationship between the discriminator value and the measured magnitudes of the AC and DC resistance. The particular embodiment of the present invention used in a specific application will depend on the accuracy and repeatability required in that application. The determination of the presence or absence of a metallic target can accurately be determined with a first order calculation in most cases while a highly accurate distance measurement may require a more complex mathematical determination.

In a preferred embodiment of the present invention, the real AC resistance is used in association with the DC resistance. However, it should be understood that the imaginary AC impedance, or reactance $X_{AC}$, could also be utilized either in place of the real component of the inductance, or the AC resistance, or in addition to it. In other words, a more precise result could possibly be achieved by measuring the DC resistance, the real AC impedance and the imaginary AC impedance and then comparing these three parameters to predetermined relationships that mathematically correlate to the distance between the sensor face and a target object.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Throughout the Description of the Preferred Embodiment of the present invention, like reference numerals will be used to describe like components and circuit elements.

Figure 1:
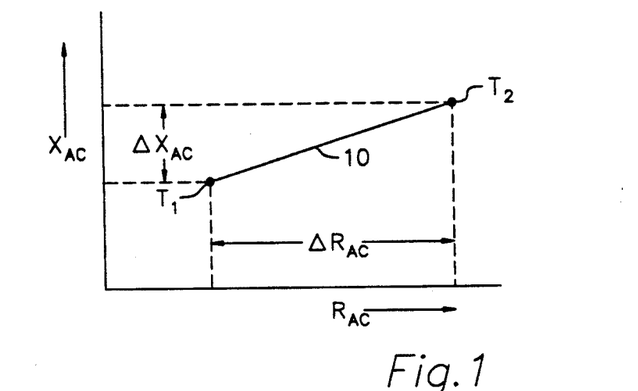
FIG. 1 illustrates the effect of temperature change on both the real and imaginary components of impedance in a sensor coil.

Proximity sensors employ a coil which is mounted proximate a face surface of a sensor housing. The coil is connected to the output of a oscillator for the purpose of providing a relatively high frequency alternating current through the coil winding. One particular type of proximity sensor is the eddy current killed oscillator, or ECKO, described above. Although the particular characteristics of a proximity sensor will vary as a function of its particular components such as coil configuration, wire size, etc., its real and imaginary impedance values will vary as a function of temperature. Depending on the particular configuration and characteristics of the proximity sensor, either the real impedance component or the imaginary impedance component will be more significantly dependent on temperature change. With reference to FIG. 1, an exemplary temperature dependence is illustrated, showing the change in both real impedance $R_{AC}$ and imaginary impedance $X_{AC}$. In the hypothetical example shown in FIG. 1, it can be seen that a change from temperature $T_1$ to temperature $T_2$ results in a change in both the real impedance component and the imaginary impedance component even though the target distance is constant. However, as illustrated by the slope in the line identified by reference numeral 10, this change in temperature from $T_1$ to $T_2$ results in a much more significant change in the real impedance component than in the imaginary impedance component. A proximity sensor which exhibits the characteristics shown in FIG. 1 will be used below to describe the present invention and to illustrate one particularly preferred embodiment of the present invention. However, it should be understood that the present invention can also be employed in association with a proximity sensor which exhibits characteristics different than those shown in FIG. 1. In other words, if the effect on the imaginary impedance component is determined to be significantly greater than the affect on the real impedance component, an alternative embodiment of the present invention could permit it to be used with a sensor with those characteristics.

The total impedance Z of a proximity sensor comprises the real component $R_{AC}$ and the imaginary component $X_{AC}$ as shown below in equation 1.

$$Z = R_{AC} + jX_{AC} \quad (1)$$

The total impedance of a proximity sensor is a function of both the target distance and temperature, wherein target distance is defined as the distance between a metallic target and the face of the proximity sensor. The real AC resistance $R_{AC}$ is, in turn, equal to the sum of the DC resistance $R_{DC}$ and the resistance $R_{EDDY}$ that results from the creation of eddy currents in the target material, in the sensor core material, and surrounding metal structures. This relationship is shown below in equation 2.

$$R_{AC} = R_{DC} + R_{eddy} \quad (2)$$

Figure 2:
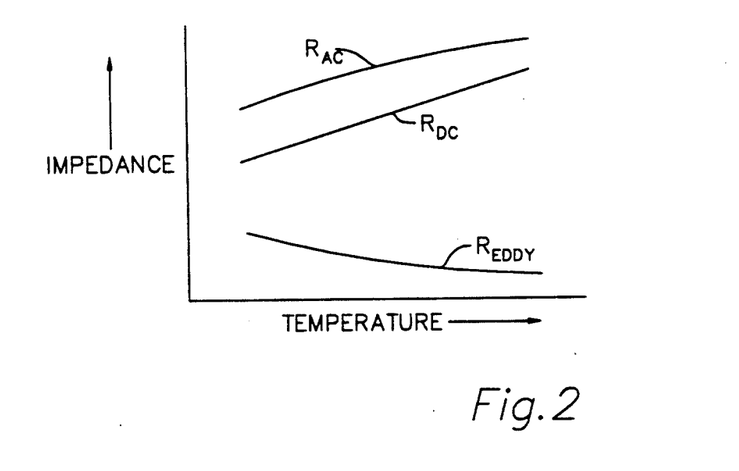
FIG. 2 shows the effect of temperature on the DC resistance and eddy current resistance components of the AC resistance of a sensor coil.

Typically, the DC resistance $R_{DC}$ and the eddy current resistance $R_{eddy}$ vary in opposite directions as a function of temperature. This relationship is illustrated in FIG. 2, where the DC resistance increases as a function of temperature increase and the eddy current resistance decreases as a function of temperature increase. It should be understood that, although FIG. 2 is hypothetical in nature and intended to illustrate general principles, the DC resistance and eddy current resistance values usually change in different directions and at different slopes as a function of temperature change. Also shown in FIG. 2 is the sum of the DC resistance and the eddy current resistance which, as discussed above, is the real AC resistance $R_{AC}$. It should be understood that the relationships shown in FIG. 2 are generally not linear. In other words, the change of the DC resistance or the eddy current resistance, as a function of temperature, can not be assumed to be linear in all cases. However, for the purposes of this exemplary discussion, the perfect linearity of these relationships is not necessary for the proper operation of the present invention.

It should be understood that the D resistance of the coil is a reliable means for determining the temperature of the coil. The relationship between the resistance of a metal and its temperature is easily determined and is consistent for a wide range of temperatures. Therefore, by knowing the metallic characteristics of the coil in the sensor, a measurement of the DC resistance of the coil provides an accurate determination of the temperature of the coil.

If the relationships of the eddy current resistance and DC resistance shown in FIG. 2 were both perfectly linear as a function of temperature, it is apparent that a straight line relationship between the AC and DC resistances could be determined by providing an appropriate constant, or factor, as a multiplier of the DC resistance. In other words, if the eddy current resistance shown in FIG. 2 is a perfectly linear function of temperature change the relationship between the AC and DC resistances would also be generally linear.

Based on empirical data, a discriminator value magnitude d can be mathematically determined from the values of the AC and DC resistances for a plurality of target distances. If an appropriate constant, or factor $K_{RE}$, could then be determined, the discriminator value would be defined as shown in equation 3 below.

$$d = R_{AC} - K_{RE}R_{DC} \quad (3)$$

Figure 3:
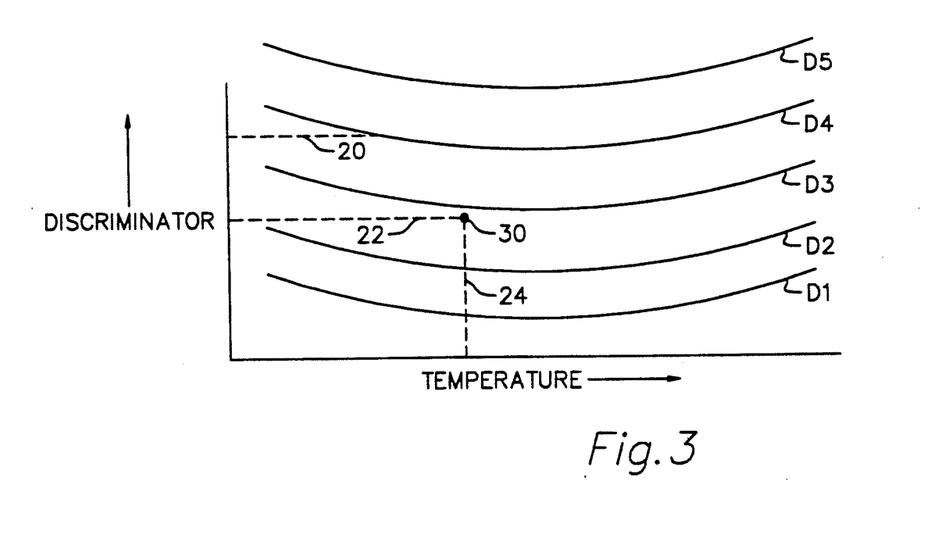
FIG. 3 shows the relationship of several discriminator value magnitudes and temperature.

If the real AC resistance and the DC resistance can be measured by a proximity sensor, the discriminator value d could be calculated or electronically determined and the magnitude of the discriminator value could be used to identify the distance between the proximity sensor face and the target. After the discriminator value is calculated as a function of the measured parameters, $R_{AC}$ and $R_{DC}$, the magnitude of the discriminator value can be used to determine the distance between the proximity sensor face and the target. In FIG. 3, a plurality of lines D1-D5 are shown describing the functional relationship between the discriminator and the temperature.

As illustrated in FIG. 3, a magnitude of discriminator value represented by dashed line 20 indicates that the distance between the target and the sensor face is that which is represented by line D4. The plurality of functional relationship lines shown in FIG. 3 are intentionally shown as being slightly nonlinear. However, it should be understood that more linear relationships can be determined if more complex equations than those shown above are used. In other words, if a discriminator is defined as a third order function of the AC and DC resistances, more linearity can be achieved and the lines D1-D5 in FIG. 3 would be typically straight and horizontal. The lines D1-D5 are shown as being nonlinear to illustrate the fact that this nonlinearity can be accommodated through normal operation of the present invention. In other words, since the DC resistance measured by the present invention is directly proportional to the temperature of the coil, the temperature can be calculated and, in association with the known discriminator magnitude, a precise temperature can be determined. For example, if a discriminator magnitude represented by dashed line 22 is derived mathematically from the AC and DC resistance provided by the present invention and a temperature reading represented by dashed line 24 is determined as a function of the DC resistance provided by the present invention, these two values can be used to precisely determine the distance between the target metal and the sensor face. As can be seen in FIG. 3, dashed lines 22 and 24 intersect at point 30. Even though the sensor does not have a precise threshold value which intersects point 30, the sensor can perform an interpolation procedure because of the precisely identified position of point 30 in relation to lines D2 and D3.

The present invention provides several alternative choices regarding the particular determination of the discriminator value and the distance between the target and the sensor face. Although equation 3 shows a direct mathematical determination of the discriminator value magnitude according to a first order of mathematical relationship, it should be understood that other options are available within the scope of the present invention. For example, a much more complex relationship than that shown in equation 3 could be used. That relationship would be determined through statistical analysis and multiple regression of empirically obtained data. The data would be used to correlate the distance between the target and sensor to the values of the AC and DC resistances wherein the AC resistance could be the real component, the imaginary component or a mathematical combination of both. In alternative embodiments of the present invention, a look up table could be utilized and stored in the memory of the microprocessor 140. Depending on the accuracy required in any particular application, the look up table could vary from relatively small numbers of stored data to extremely large numbers that would permit the microprocessor to select from the table the distance that most closely correlates to the AC and DC resistances. In addition, the microprocessor could interpolate between values in the stored look up table to more accurately determine the distance between the target and the sensor.

Figure 4:
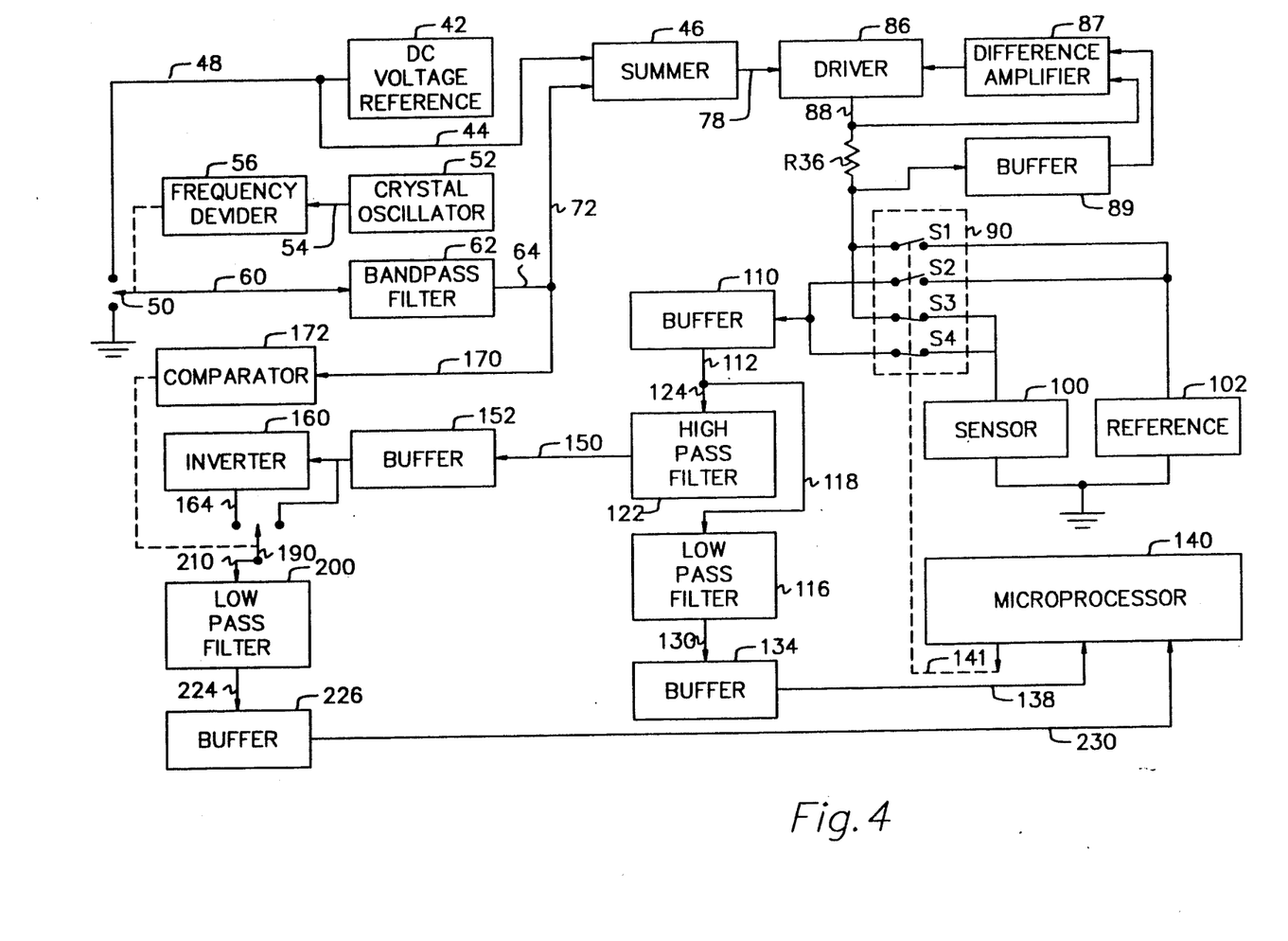
FIG. 4 is a simplified schematic block diagram of one embodiment of the present invention.
Figure 5:
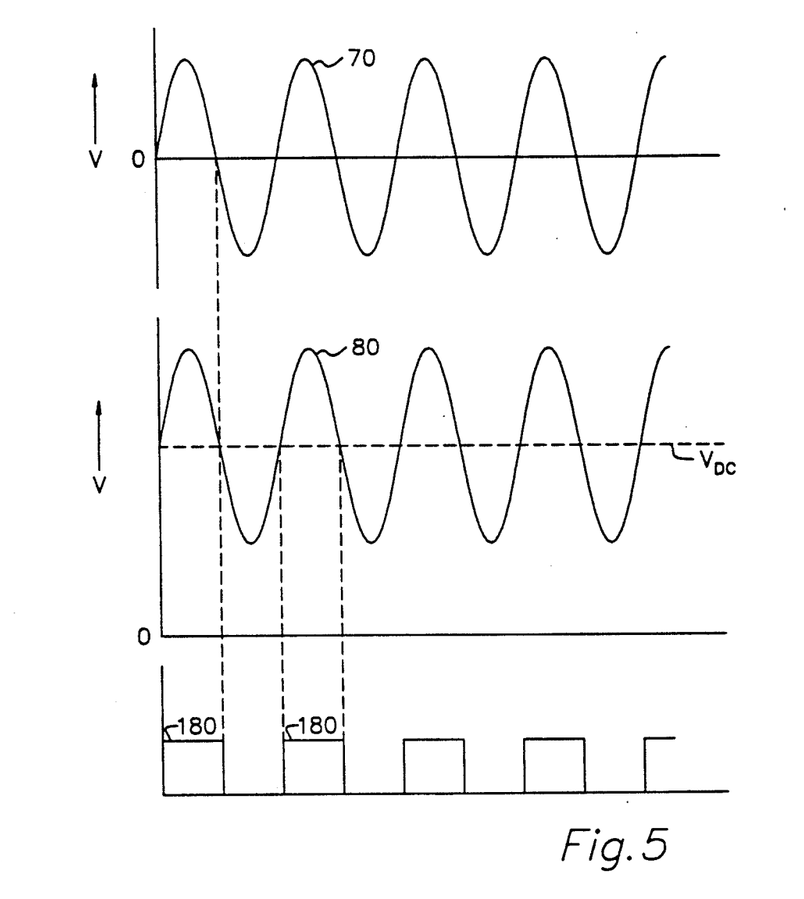
FIGS. 5 and 6 illustrate several exemplary waveforms at selected portions of the circuit of FIG. 4.

In order to measure the AC and DC resistances necessary to perform the functions described above, the present invention provides a circuit which is illustrated in FIG. 4 as a functional block schematic diagram. A DC voltage reference source 42 provides a predetermined DC voltage on line 44 to a summer 46 and on line 48 to a switch 50. A crystal oscillator 52 provides a high frequency AC signal on line 54 to a frequency divider 56 which has an output that is used to control switch 50. In a particularly preferred embodiment of the present invention, the frequency output from the crystal oscillator is 1.8432 MHz. The output from the frequency divider 56 is 980 Hertz after being divided by 2048 by divider 56. The output from the frequency divider is a square wave that provides a series of square wave pulses on line 60 which have an accurately preselected voltage magnitude. The bandpass filter 62 converts the square wave input on line 60 to a sinusoidal output on line 64 which is illustrated as wave form 70 in FIG. 5. As can be seen in FIG. 5, wave form 70 is sinusoidal and oscillates about a magnitude of zero volts.

With continued reference to both FIGS. 4 and 5, the DC reference voltage on line 44 and the sinusoidal signal 70 on line 72 as inputs to the summer 46. The output of the summer, on line 78 is represented by waveform 80 in FIG. 5. As can be seen, the sinusoidal waveform 70 is increased by the DC reference voltage $V_{REF}$. The primary function of the driver 86 is to provide a current on line 88 which is a function of the voltage magnitude on line 78. The differential amplifier 87 and the buffer 89, in cooperation with resistor R36, are provided for the purpose of monitoring the current at the output of the driver 86. Buffer 89 provides a voltage signal to the differential amplifier 87 that is representative of the voltage drop across resistor R36. The feedback signal from the differential amplifier 87 is used to make the driver 86 function as a current pump. The current on line 88 passes through the switching mechanism 90 to either the sensor 100 or, in one particular alternative embodiment of the present invention, to a reference component, such as a resistor. In FIG. 4, the reference device is identified by reference numeral 102. The reference 102 can be a precision reference resistor which exhibits no temperature dependency. As can be seen, the switching mechanism 90 can alternatively connect the reference 102 or the sensor coil 100 to the circuit under the control of a microprocessor.

A buffer 110 is connected to the output of the switching mechanism 90 and, in a preferred embodiment of the present invention, comprises an operational amplifier that operates as a voltage follower to isolate the components in the lower left portion of FIG. 4 from the sensor 100. The output from the buffer 110 is provided on line 112 to a low pass filter 116 through line 118 and to a high pass filter 122 through line 124. The input on line 118 to a first low pass filter 116 is representative of the total voltage across the sensor 100. That signal is the signal represented by reference numeral 80 in FIG. 5, effected by the operation of the sensor which could possibly increase its magnitude and perform a phase shift in response to the interaction between a target and the sensor coil. As signal 80 passes through the low pass filter 116, the alternating sinusoidal oscillations are removed and the remaining DC voltage component is provided on line 130 to buffer 134. This DC component of waveform 80 represents the DC voltage across the sensor. Since the driver 86 provides a known current through switching mechanism 90 to the sensor, the magnitude of the DC component of its voltage can be used to calculate $R_{DC}$ which can be used to determine the temperature of the proximity sensor coil winding. The signal representing this DC resistance $R_{DC}$ is provided by the buffer 134 on line 138 to a microprocessor 140. It should be understood that, although a microprocessor 140 is used in a preferred embodiment of the present invention to perform the mathematical manipulations, a microprocessor is not required in all embodiments of the present invention and, instead, many of the relationships can be determined through the use of electronic components.

With reference to FIG. 4, the microprocessor 140 also has control over the switching mechanism 90 as indicated by line 141. Although the switching mechanism 90 and the control of the mechanism by the microprocessor 140 is not a requirement in all embodiments of the present invention, a preferred embodiment of the present invention permits the microprocessor to disconnect the sensor 100 from electrical communication with the circuit and, in its place, connect reference 102 to the circuit. Reference 102 is a reference component, such as a precision resistor, that can be periodically connected to the circuit to permit the microprocessor 140 to obtain measurements on line 138 and 230 to determine the proper calibration of the system. The signals on lines 138 and 230 provide important information that permit the microprocessor to determine the proper operation of the present invention. The reference resistor should be one that exhibits a very low temperature sensitivity. By measuring the resistance of the reference resistor, the microprocessor 140 can determine the accuracy of the circuit components used to measure the AC and DC resistances which are determined during the normal operation of the present invention when the sensor 100 is connected to the circuit. Although many alternative strategies can be employed, a typical strategy in the use of the reference 102 would be to have the microprocessor 140 programmed to periodically connect the reference to the circuit for very short periods of time as a periodic calibration check. An alternative embodiment would have the microprocessor make this calibration step only on command from the operator at a time when it can be confidently determined that no target distance requires determination.

The signal 80 which is provided on line 124 to the high pass filter, results in an output from the high pass filter 122 of a signal that is generally similar to that which is represented by reference numeral 70 in FIG. 5 on line 150. This signal is provided to the buffer 152 which, in turn, provides the same signal on line 154 to the invertor 160. Therefore, it should be apparent that the signal on line 164 is the inverted form of the signal on line 162.

The output from the bandpass filter 62 is provided on line 170 to a comparator 172 which provides a series of square wave output pulses 180 which are illustrated in FIG. 5. The square wave pulses 180 are used to actuate a switch 190 that alternatively connects a low pass filter 200 to the invertor 160 and to the buffer 152. With reference to FIGS. 4, 5 and 6B, the signal on line 162 in FIG. 4 is identified by reference numeral 204 in FIG. 6B and the signal on line 164 in FIG. 4 is identified by the dashed line wave form 206 in FIG. 6. As can be seen, Wave form 206 is the inverted form of wave form 204. In FIG. 6B, squarewave 180 is shown aligned With a first representation 300 of waveforms 204 and 206. Switch 190 in FIG. 4 is controlled by the comparator 172 according to the voltage level of squarewave 180. In other words, when the waveform 180 provides a high logic level signal to switch 190, wave form 204 is connected to the input of the low pass filter 200 and, conversely, when a low logic level signal is provided by comparator 172 to switch 190, waveform 206 is connected to the input of the low pass filter 200. With reference to the first representation 300 of the waveforms, the cross hatched portions of waveforms 204 and 206 represent the signal provided to the low pass filter 200 on line 210 in FIG. 4. Since the low pass filter 200 operates to remove ripple from the wave form, the output from the low pass filter 200 on line 224 is represented by exemplary dashed line 302 and the magnitude of the signal on line 230 is identified in FIG. 6B as S230. The signal on line 230 is representative of the AC resistance of the sensor coil and can be used by the microprocessor 140 to calculate the AC voltage across the sensor. This information, in turn, permits the microprocessor to compare the AC voltage to the known AC current provided by the driver 86 for the purpose of determining the AC resistance of the coil.

With continued reference to representation 300 in FIG. 6B, it should be noted that both waveforms, 204 and 206, are slightly shifted with respect to the period of squarewave 180. That slight phase shift is identified as $\theta_1$ in FIG. 6B. The phase shift will be described in greater detail below.

The representation identified by reference numeral 310 in FIG. 6B shows waveforms 204 and 206 as they would appear if a metallic target is disposed proximate the face of the sensor. The effect on the waveforms is twofold. The magnitude of the voltage signal is increased in response to a metallic target moving proximate the sensor face and the waveform, 204 or 206, is phase shifted in response to a metallic target moving toward the sensor. For example, representation 300 is exemplary of the absence of a metallic target and representation 310 is exemplary of the presence of a metallic target. As can be seen by comparing these two representations in FIG. 6B, the voltage magnitude M1 of representation 300 is less than the magnitude M2 of representation 310. Furthermore, the phase shift $\theta_2$ is greater than phase shift $\theta_1$.

Figure 6A:
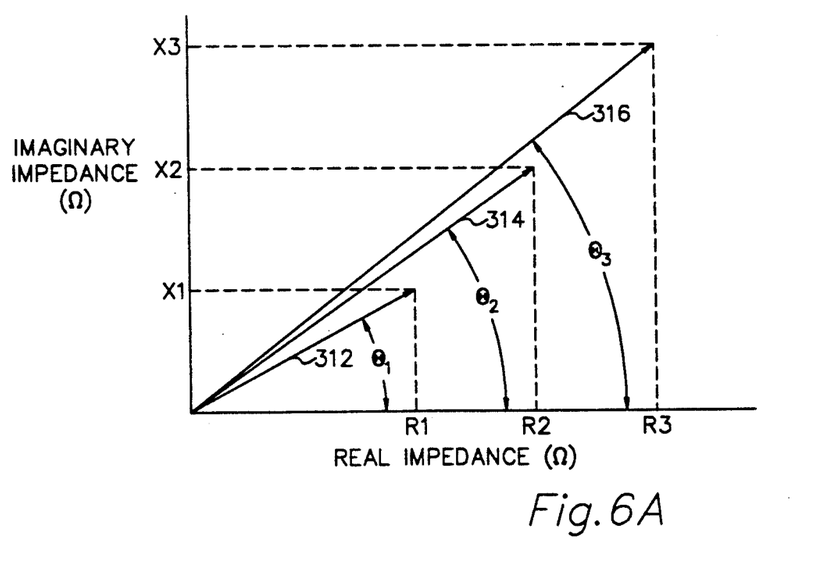
Figure 6B:
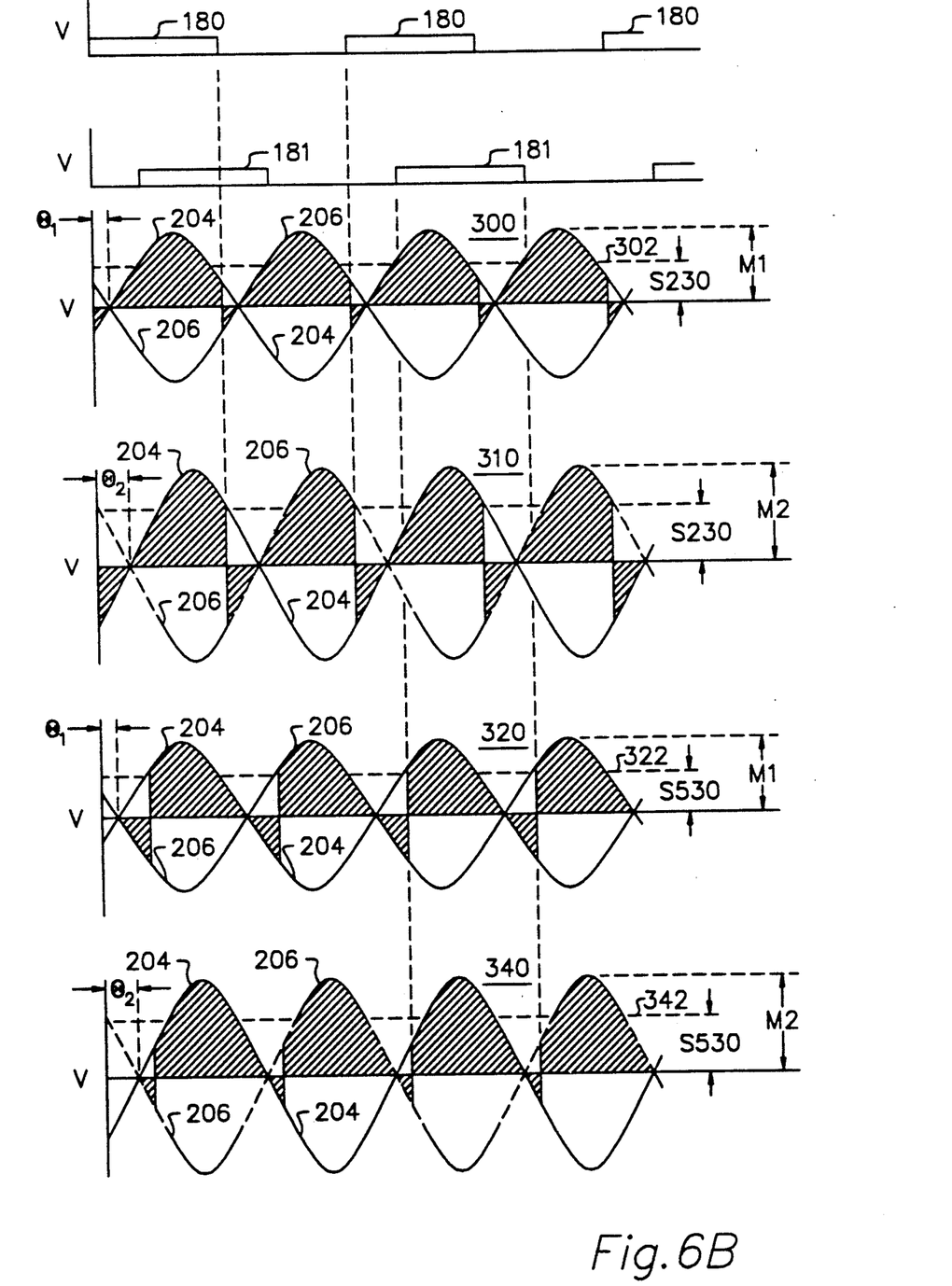

By comparing FIGS. 6A and 6B, the total impedance of the sensor coil is represented by vector 312 and can be identified by its angular disposition and the magnitudes of its real and imaginary impedances. Although the waveforms shown in FIG. 6B represent the voltage magnitudes as several points in the circuit of the present invention, it should be understood that they are also representative of the AC and the D resistances because of the fact that the AC and DC currents are rigorously controlled by the circuit of the present invention. The use of the DC voltage reference 42 to provide a regulated voltage level on lines 44 and 48 provides accurately regulated voltage levels at the input of the driver 86. Therefore, as the present invention is discussed in conjunction with FIGS. 6A and 6B, the magnitudes of the voltages in the figures should be considered representative and analogous to the magnitudes of the impedances. Vector 312 has a length which is representative of the magnitude identified by M1 in FIG. 6B. In addition, the angle identified as $\theta_1$ in FIG. 6A is identical to the phase shift similarly in FIG. 6B. This results in a real impedance of R1 and an imaginary impedance of X1, wherein the signal on line 230 is representative of the real impedance R1.

With continued reference to FIG. 6A, vector 314 has an angle of $\theta_2$ and a length that is equivalent to M2 in FIG. 6B. The DC signal identified as S230 in representation 310 can be seen to be greater in magnitude than the similarly identified DC level in representation 300. This is caused by the movement of a metallic target toward the face of the sensor. In addition, the phase shift identified as $\theta_2$ in representation 310 is also shown in FIG. 6A. This magnitude and phase angle of vector 314 results in a real impedance of R2 and an imaginary impedance of X2. If a metallic target is moved even closer to the face of the sensor, the effect of total impedance would be illustrated by vector 316 in FIG. 6A which exhibits a greater length than the other vectors and a greater phase shift $\theta_3$ than vectors 312 and 314. This results in a real impedance identified as R3 and an imaginary impedance identified as X3. The waveform corresponding to vector 316 in FIG. 6A is not shown in FIG. 6B.

As mentioned above, the preferred embodiment of the present invention utilizes the real component of the impedance of the coil illustrated in FIG. 1. However, an alternative embodiment of the present invention could also incorporate appropriate circuitry to measure the imaginary component of the impedance. That imaginary component would be measured through the additional circuitry shown in FIG. 7. For purposes of this illustration, the comparator 172, the invertor 160, the buffer 152 and the low pass filter 200 that were described above in conjunction with FIG. 6 are also illustrated in FIG. 7 as a reference to the interconnections of the imaginary impedance components circuitry which will be described below.

An additional comparator 472 is connected by line 470 to the band pass filter 162. The invertor 460 is connected as shown by line 153 to line 150 which, in turn, is connected to the output of the high pass filter 122 shown in FIG. 4. The output from the comparator 472 is used to control switch 490 which operates to provide a rectified signal on line 10 to the low pass filter 500. In the manner similar to the operation of low pass filter 200, low pass filter 500 provides a signal on line 524 to buffer 526 which, in turn, provides a signal on line 530 to the microprocessor 140. The circuit comprising comparator 472 is configured to effect a phase shift on the signal of line 470 which is 90 degrees different than the signal from comparator 172. In FIG. 6B, the squarewave signal output from comparator 472 is identified by reference numeral 181. As can be seen, it is phase shifted by 90 degrees relative to squarewave signal 180.

Figure 7:
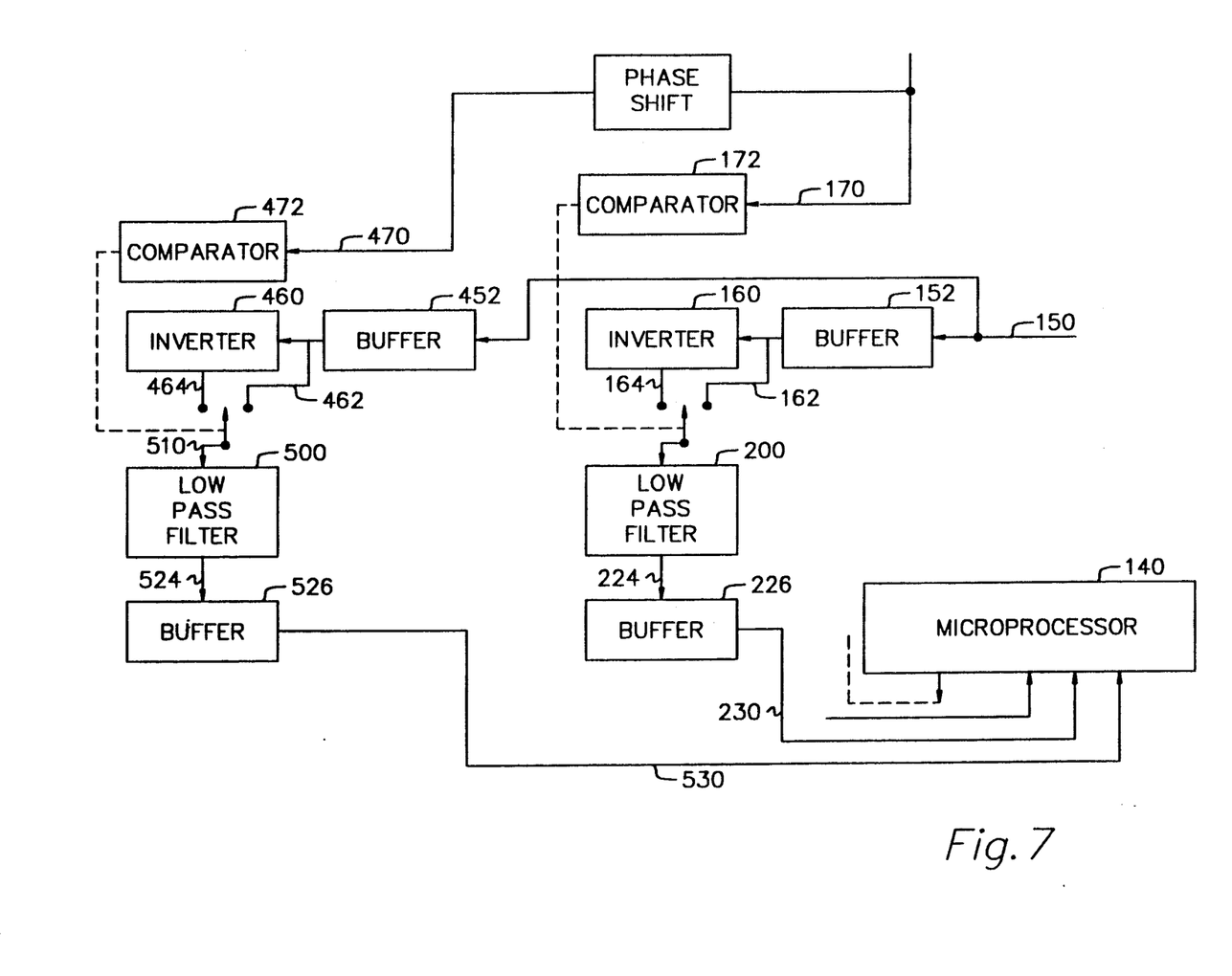
FIG. 7 shows an alternative embodiment portion of the circuit of FIG. 4.

With reference to FIGS. 6A, 6B and 7, it should be understood that comparator 472 controls the operation of switch 490 in the manner which is similar to that described above in relation to comparator 172 and switch 190. In this description of the alternative embodiment of the present invention, reference numerals 204 and 206 will be used to identify the waveforms on lines 462 and 464, respectively, because the signal on lines 162 and 462 are identical in this embodiment of the present invention as are the signals on lines 164 and 464. The only difference between the two subcircuits in FIG. 7 is that comparator 472 shifts the squarewave output by a magnitude of 90 degrees relative to comparator 172. That is illustrated in FIG. 6B by comparing squarewaves 180 and 181. No effective change is made to the magnitudes or phase positions of signals 204 and 206 other than the changes caused by the effect on the sensor coil by the presence or absence of a magnetic target and its proximity to the sensor face.

The description of the alternative embodiment illustrated in FIG. 7 will be described below in conjunction with representations 320 and 340 in FIG. 6B. When switch 490 connects the output of buffer 452 to the input of low pass filter 500, waveform 204 is provided on line 510. Conversely, when switch 490 connects to the output of invertor 460 to the low pass filter, waveform 206 is connected to the low pass filter on line 510. Therefore, the crosshatched portions of the waveforms in representation 320 illustrate the voltage magnitudes that would pass to the low pass filter 500. Since the low pass filter operates to remove ripple from the wave form, the output signal from buffer 526 on line 530 would be such as that which is represented by dashed line 322. With reference to FIG. 6A, this magnitude is analogous to imaginary impedance X1 because the voltage M1 is analogous to the length of vector 312. Representation 340 in FIG. 6B is exemplary of a condition when a metallic target moves to a region proximate the coil of the sensor. This causes the voltage to increase to a magnitude of M2 which provides an output from buffer 526 that is represented by dashed line 342. Magnitude M2 in FIG. 6B is analogous to the length of vector 314 and, in combination with the face shift $\theta_2$, results in a real impedance R2 and an imaginary impedance X2. The imaginary impedance represented by line 342 in FIG. 6B is representative of imaginary impedance X2.

With reference to FIG. 6B, several important facts should be realized in relation to the above described exemplary conditions. The relative association of a metallic target and the sensor face representations 310 and 340 are identical to each other. In other words, when a metallic target is at a preselected distance from the sensor face, representation 310 illustrates the operation of one portion of the circuit which determines the real impedance of the circuit and representation 320 illustrates the operation of another portion of the circuit which is used to measure the imaginary impedance of the coil. These two portions of the circuit are illustrated in FIG. 7. This is why the magnitude identified by M1 in FIG. 6B is the same for representations 300 and 320 and, similarly, the magnitudes identified as M2 are identical to each other in representations 310 and 340.

It should be understood that the phase shift identified as $\theta_1$ in FIGS. 6A and 6B is the result of the fact that coil of sensor 100 is inductive in nature. The increased phase shift identified as $\theta_2$ is due to the fact that a metallic target has moved into the range of the coil and has affected the total impedance of the coil. As described above, this effect of the target on impedance of the coil raises the magnitude of the voltage signal on line 150 and shifts its phase. The net effect of these two changes is to raise the magnitude of the signal provided on lines 230 and 530. This two fold effect can be seen in FIG. 6A which shows the manner in which these changes are caused vectorially. As a metallic target moves from an infinite distance (i.e. absence) from the sensor toward the sensor, the vectorial representation changes from vector 312 to 314 and then to 316 as the target moves closer and closer toward the face of the sensor.

FIGS. 6A, 6B and 7 illustrate how the present invention can provide signals that represent either the real AC resistance or the imaginary AC reactance, either individually or together in the same circuit. Depending on the characteristics of the sensor 100, and its temperature dependency, either the real or imaginary component of the impedance can be used in accordance with the present invention. The selection of these optional circuits would be made as a function of the temperature dependency illustrated in FIG. 1. If a sensor exhibited an AC resistance that is highly dependant on temperature, but an inductance which is only slightly temperature dependent, the embodiment of the present invention illustrated i FIG. 4 would be appropriate. If the opposite where true, the inductance could be measured without measuring the AC resistance. If, on the other hand, the sensor exhibited temperature dependance in both ways, the circuit of FIG. 4 modified in accordance with FIG. 7 would be the most appropriate.

Figure 8:
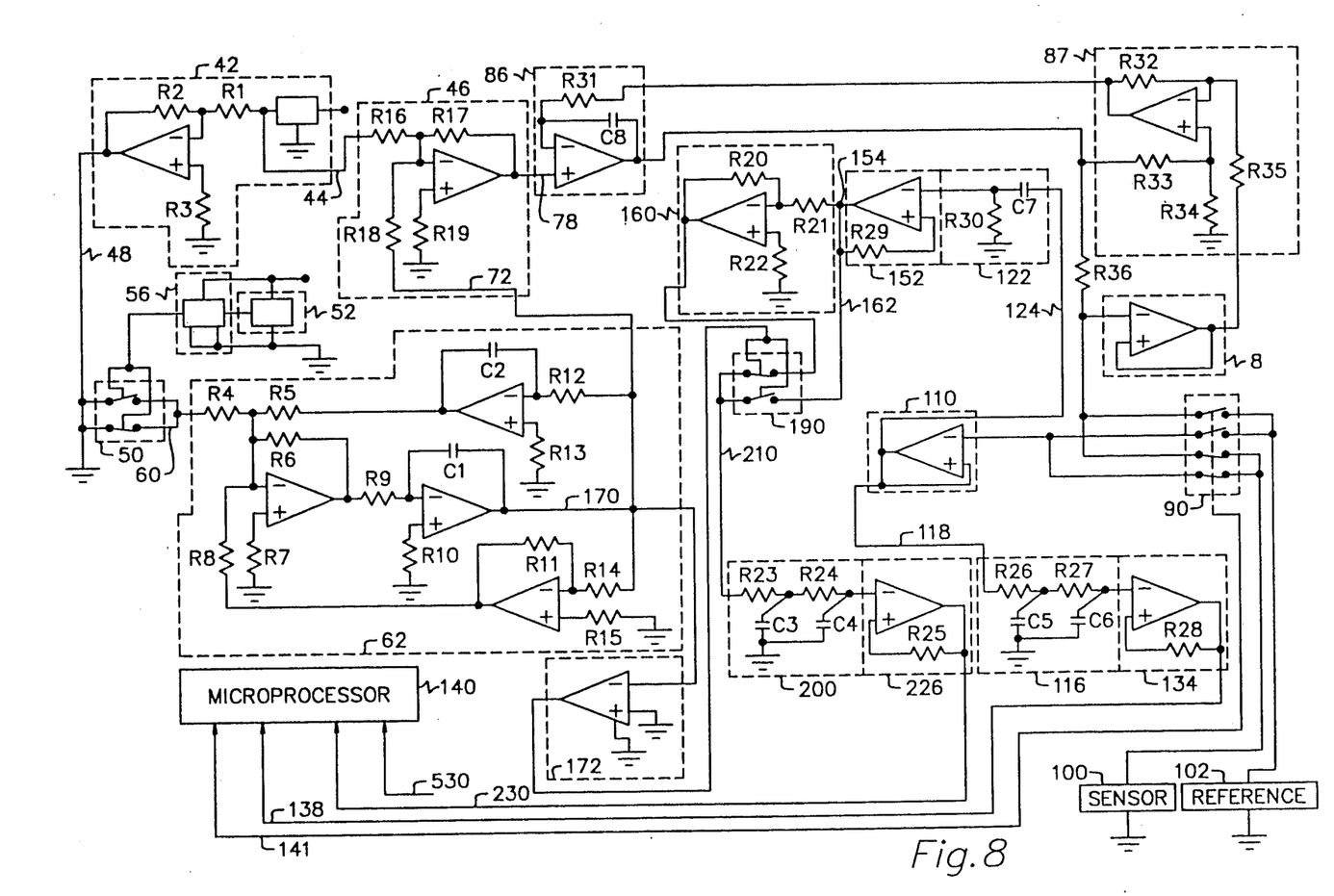
FIG. 8 shows a detailed schematic of the circuit of FIG. 4.

FIG. 8 illustrates a detailed schematic of the circuit of FIG. 4. Each of the dashed boxes in FIG. 8 represents a block in the diagram of FIG. 4. Like reference numerals have been used in FIGS. 4 and 8 to simplify the comparison between these illustrations. Table I describes the values of the resistors and capacitors in FIG. 8. The other components in FIG. 8, such as the switches, the operational amplifiers and the microprocessor, are not defined in detail in Table I, but it should be understood that these components are standard components available in commercial quantities and are utilized in the circuit of FIG. 8 according to techniques which are well known to those skilled in the art. It should also be understood that many alternative embodiments of the present invention could utilize alternative values of components and alternative switches, operational amplifiers and microprocessors.

TABLE I

| COMPONENT | VALUE |
| --- | --- |
| R1 | 51.1KΩ |
| R2 | 10KΩ |
| R3 | 8.25KΩ |
| R4 | 100KΩ |
| R5 | 10KΩ |
| R6 | 10KΩ |
| R7 | 3.24KΩ |
| R8 | 10KΩ |
| R9 | 11.8KΩ |
| R10 | 11.8KΩ |
| R11 | 10KΩ |
| R12 | 11.8KΩ |
| R13 | 11.8KΩ |
| R14 | 100KΩ |
| R15 | 10KΩ |
| R16 | 196KΩ |
| R17 | 10KΩ |
| R18 | 10KΩ |
| R19 | 4.87KΩ |
| R20 | 10KΩ |
| R21 | 10KΩ |
| R22 | 5.11KΩ |

TABLE I-continued

| COMPONENT | VALUE |
| --- | --- |
| R23 | 24.9KΩ |
| R24 | 100KΩ |
| R25 | 124KΩ |
| R26 | 24.9KΩ |
| R27 | 100KΩ |
| R28 | 124KΩ |
| R29 | 100KΩ |
| R30 | 100KΩ |
| R31 | 10KΩ |
| R32 | 10KΩ |
| R33 | 10KΩ |
| R34 | 10KΩ |
| R35 | 10KΩ |
| R36 | 100KΩ |
| C1 | .015 MICROFARAD |
| C2 | .015 MICROFARAD |
| C3 | .47 MICROFARAD |
| C4 | .10 MICROFARAD |
| C5 | .47 MICROFARAD |
| C6 | .10 MICROFARAD |
| C7 | 1 MICROFARAD |
| C8 | 150 PICOFARAD |

With particular reference to the microprocessor 140 in FIG. 8, it can be seen that four signal lines are connected to the microprocessor. Line 138 connects the microprocessor with the output of buffer 134 and provides a signal which is representative of the DC voltage of the sensor 100. As described in greater detail above, this value permits the microprocessor to determine the DC resistance of the coil and, therefore, the temperature of the sensor coil because of the very predictable relationship between temperature and DC resistance of the coil within the sensor 100. For example, the resistance of copper changes by 0.39% per degree celcius. It also permits the microprocessor to perform the calculations described above in the determination of the discriminator value magnitude. Signal line 230 connects the microprocessor 140 to the output of buffer 226 for the purpose of receiving a signal that is representative of the AC voltage of the sensor coil which allows the calculation of AC resistance. The AC resistance $R_{AC}$, in association with the DC resistance $R_{DC}$, permits the microprocessor to perform the calculation described in equation 3 above. Also shown in FIG. 8 is a signal line 530 which connects the microprocessor 140 in signal communication with a portion of the circuit that provides a voltage signal which is representative of the imaginary impedance component of the coil. Although this portion of the circuit is not illustrated in the embodiment of FIG. 8, it should be understood that the components illustrated in FIG. 7 and described above could be added to the circuit of FIG. 8 to provide the information that would be transmitted to the microprocessor 140 on line 530 if it is desirable to provide the imaginary component of impedance to the microprocessor. As described in greater detail above, that addition to the circuitry would be appropriate if it is determined that the imaginary component is significantly changed as a function of temperature. The use of both parameters, real and imaginary impedance, permits a significant improvement in accuracy.

A comparison of FIGS. 4 and 8 indicate that the simplified switches 50 and 190 in FIG. 4 have been replaced by double pole switches 50 and 190 in FIG. 8. It should be understood that this selection of switch type is a function of the particular application of the present invention and does not represent a change in the scope of the present invention. Rather, it represents a design choice that is a function of the specific application in which the present invention is employed.

Although the present invention has been described with particular specificity and illustrated in significant detail to illustrate both a particularly preferred embodiment of the present invention and an alternative embodiment of the present invention, it should be clearly understood that many other alternative embodiments are within its scope.

The embodiments of the invention in which an exclusive property or right is claimed are defined as follows:

1. A proximity sensor, comprising:
   a coil;
   means for causing an alternating electrical current to flow through a winding of said coil;
   first means, connected in signal communication with said winding, for measuring the DC resistance of said winding;
   second means, connected in signal communication with said winding, for measuring the AC impedance of said winding; and
   means, connected in signal communication with said first and second measuring means, for determining a distance between a metallic object and said coil as a function of said AC impedance and said DC resistance.

2. The sensor of claim 1, wherein:
   said first measuring means comprises a means for driving a DC current through said winding and a first low pas filter connected in electrical communication with said winding.

3. The sensor of claim 1, wherein:
   said first measuring means comprises means for summing a DC reference voltage with an AC voltage, said summing means having an output connected in electrical communication with said causing means.

4. The sensor of claim 1, wherein:
   said second measuring means comprises a high pass filter connected in electrical communication with said winding, an output of said high pass filter being connected to a means for inverting said high pass filter output.

5. The sensor of claim 4, wherein:
   said second measuring means further comprises means for alternately connecting said high pass filter output and said inverted high pass filter output to an input of a second low pass filter, an output signal of said second low pass filter being representative of said AC resistance.

6. The sensor of claim 1, wherein:
   said second measuring means is configured to measure a real impedance component of said AC impedance.

7. The sensor of claim 1, wherein:
   said second measuring means is configured to measure an imaginary impedance component of said AC impedance.

8. The sensor of claim 1, further comprising:
   a microprocessor connected in signal communication with said first and second measuring means, said microprocessor comprising said deriving means and said determining means.

9. The sensor of claim 1, further comprising:
   a reference component connectable to said first and second measuring means.

10. The sensor of claim 9, wherein:
    said reference component is a precision resistor with a low degree of temperature sensitivity.

11. The sensor of claim 1, further comprising:
means for deriving a magnitude of a discriminator value as an intermediate function of said AC impedance and DC resistance, said distance being determinable as a function of said discriminator value magnitude.

12. The sensor of claim 1, wherein:
said AC impedance is a real component of AC impedance.

13. A proximity sensor, comprising:
first means for providing a DC voltage;
second means for providing an AC voltage;
means for summing said AC and DC voltages to form a combined voltage, said summing means being connected in electrical communication with said first and second providing means;
means for driving a current through a coil of said sensor, said current being a function of said combined voltage;
first means for measuring a DC voltage potential across said coil, said driving means and first measuring means being connected in electrical communication with said coil;
second means for measuring an AC voltage potential across said coil, said first and second measuring means being connected in electrical communication with said coil;
first means for determining a DC resistance of said coil as a function of said DC voltage potential;
second means for determining an AC impedance of said coil as a function of said AC voltage potential; and
means for deriving, connected in signal communication with said first and second determining means, a discriminator value magnitude as a function of said AC impedance and said DC resistance.

14. The sensor of claim 13, further comprising:
means for determining the distance between a metallic object and said coil as a function of said discriminator value magnitude.

15. The sensor of claim 13, wherein:
said first measuring means comprises a first low pass filter connected in signal communication with said coil.

16. The sensor of claim 15, wherein:
said second measuring means comprises a high pass filter connected in signal communication with said coil.

17. The sensor of claim 16, wherein:
said second measuring further comprises means for rectifying an output signal of said high pass filter.

18. The sensor of claim 17, wherein:
said second measuring means further comprises a second low pass filter connected in signal communication with an output of said rectifying means.

19. The sensor of claim 18, further comprising:
a microprocessor connected in signal communication with said third and fourth measuring means, said microprocessor comprising said deriving means.

20. The sensor of claim 19, further comprising:
a reference resistor connectable in electrical communication with said first and second measuring means, said reference resistor being generally temperature insensitive.

21. The sensor of claim 20, further comprising:
means for detecting the presence of a metallic object within a predefined distance of said coil as a function of said discriminator value magnitude.

22. A method of operating a proximity sensor, comprising:
providing a DC voltage;
providing an AC voltage;
summing said AC and DC voltages to form a combined voltage;
driving a current through a coil of said sensor, said current being a function of said combined voltage;
measuring a DC voltage potential across said coil;
measuring an AC impedance potential across said coil;
determining a DC resistance of said coil as a function of said DC voltage potential;
determining an AC impedance of said coil as a function of said AC voltage potential; and
deriving a discriminator value magnitude as a function of said AC impedance and said DC resistance.

23. The method of claim 22, further comprising:
determining the distance between a metallic object and said coil as a function of said discriminator value magnitude.

24. The method of claim 22, further comprising:
detecting the presence of a metallic object with a predefined distance of said coil as a function of said discriminator value magnitude.

* * * * *